Jan. 19, 1937.  R. ANNEN  2,068,589

ANNULAR BALL BEARING

Filed July 30, 1935

R. Annen
Inventor

By: Glascock Downing & Seebold
Attys

Patented Jan. 19, 1937

2,068,589

UNITED STATES PATENT OFFICE 2,068,589

ANNULAR BALL BEARING

Robert Annen, Bienne, Switzerland, assignor to the firm Louis Müller & Cie. S. A., Fabrique d'horlogerie "La Champagne," Bienne, Switzerland Application July 30, 1935, Serial No. 33,897
In Germany May 7, 1934

5 Claims. (Cl. 308—230)

The present invention relates to annular ball-bearings adapted to resist axial thrusts. Ball-bearings are already known having ball races made of stamped sheet steel. These races are generally cylindrical and therefore such bearings cannot be forced into cylindrical holes which are to receive them without being deformed and preventing the free movement of the balls. It is for this reason that the mounting of the ball bearings having the base ring made of stamped sheet metal had to be carried on with the same care as the mounting of bearings having ball races made of massive ground steel rings. The advantage of cheap manufacture was therefore entirely compensated by the trouble with the ball cages of sheet metal which could not support an outside pressure without getting deformed.

The ball bearing according to the present invention is likewise made of stamped sheet metal and comprises a cup-shaped outer race ring shaped as a body having two different rotary surfaces. Owing to the shape of this body it is possible to reserve one surface as a ball race while the other surface supports the pressure arising from pressing the bearing into its seat. Thus the ball race is preserved from any disarrangement caused by mounting the bearing and the good working remains untouched.

The drawing represents as examples several working forms of a ball bearing according to the present invention.

The Figures 1, 2, and 3 are sectional elevations of three different forms,

Figure 1:
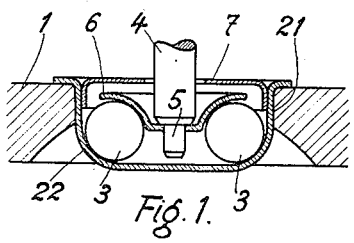

In the different figures 1 is a plate having a perforation into which the bearing is forced in by pressure. The lower race ring 2 of pressed sheet metal shows a cylindrical rotary surface 21 and a rotary surface 22 shaped like a cylindrical ring. The latter serves as a race for the balls 3 and the cylindrical portion 21 is used for fixing the bearing in its seat. The shaft 4 possesses a neck 5 upon which is held the upper funnel-shaped race ring 6. This ring is pressed of thin sheet steel and possesses some elasticity. A washer 7 closes the whole. Thus the bearing is not only preserved from dust but the lubricant is also held back under all circumstances. The lubricant will not be thrown out by centrifugal force, nor will it be evaporated. In spite of the lack of a ball cage the balls will not separate from each other. The bearing may be manufactured in all sizes down unto an outside diameter of less than $\frac{1}{8}$ of an inch. It replaces with advantage the stones hitherto used in different mechanisms because it may be mounted by pressing it in with an allowance of about $\frac{1}{32}$ of an inch.

Figure 2:
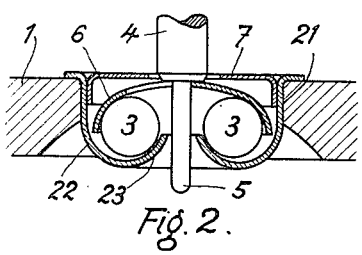

The upper race ring 6 may be open on the underside as shown in Fig. 2. In this working form the cylindrical ring 22 is shaped differently from the one in Fig. 1. It shows an annular groove 23 within which the balls have to run. Here also the cylindrical rotary surface 21 of the lower race ring may sustain a pressure without impairing the good working of the balls on the lower ball race. The inner race ring 21 and the washer 7 forms here the casing of the bearing.

Figure 3:
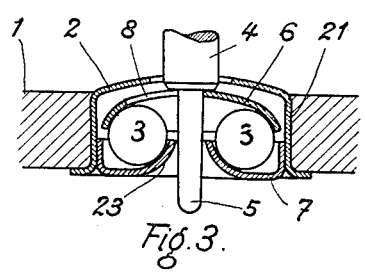
Figure 4:
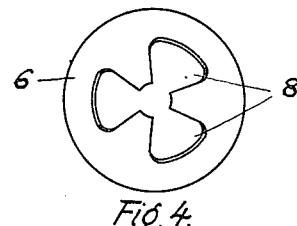
Fig. 4 shows an upper ball race of the bearing shown in Fig. 3.

In the working form of Fig. 3 the cylindrical rotary surface 21 is in one piece with the washer 2 and is separated from the lower ball race 7 which is pressed into the cylindrical portion of the washer. In order to increase the elasticity the upper race ring 6 is serrated out like a star 8 shown in Fig. 4.

Figure 5:
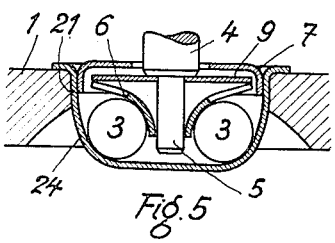
Figs. 5 and 6 are a sectional elevation and a race ring of a fourth form.
Figure 6:
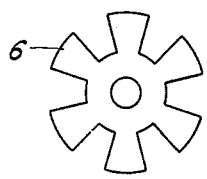

In the working form of Fig. 5 the second rotary surface instead of being cylindrical ring shaped is conically extended at 24. The upper race ring 6 is separately shown in Fig. 6 and acts as a spring so that the axial allowance of the bearing is very much increased. Instead of the ring 6 an abutment washer 9 or better both washer 9 and ring 6 could be formed as springs.

Figure 7:
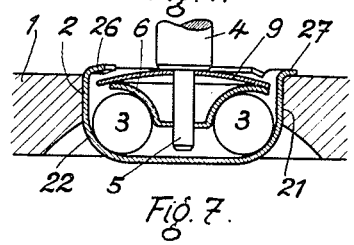
Fig. 7 is a sectional elevation of a bearing, where the upper washer serves as a spring for the upper race ring.
Figure 8:
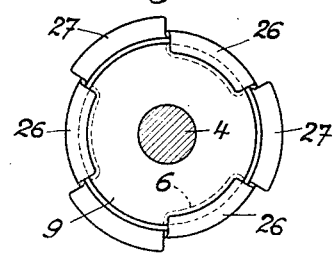
Fig. 8 is a plan thereof and Fig. 9 shows a simplified form of the bearings of Figs. 7 and 8.

The Figs. 7 and 8 show a working form where the auxiliary spring 9 is used as a cover. To prevent the parts of the bearing from dropping when the bearing is overturned the edge of the upper race ring 21 overlaps the plate 1 and is split to form lugs 26, 27 bent over alternatingly inwardly and outwardly, the inner lugs overlapping the upper race ring 6.

Figure 9:
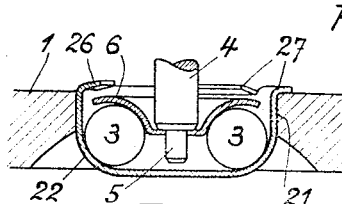

In Fig. 9 the race ring 6 serves also as a cover for the bearing. The case ring 21 of the bearing, like that of Fig. 8, is provided with lugs 26, 27 at its upper edge which are bent alternatingly inwardly and outwardly. The diameter of the race ring 6 is then chosen large enough to be overlapped by the inwardly bent lugs 26 but is small enough to be removable in an oblique position after the removal of the spindle 5. It must be remarked here as a matter of course that the bearing will only work correctly with spindles exerting an axial pressure. The upper race ring however, a little larger than the circle encircled by the ends of the lugs 26, will always be elastical enough to support said axial pressure.

What I claim is:—

1. In an annular ball bearing adapted to resist axial thrusts and in combination a plate having a hole as a seating, and cup-shaped lower race ring made of stamped sheet metal and provided with a cylindrical portion adapted to be pressed into said hole and with an adjoining cylindrical ring portion adapted to serve as a race, an upper funnel shaped race ring formed as a spring by means of its serrated edge and a spindle inserted with a neck into this upper race to be supported by the same.

2. In an annular ball bearing adapted to resist axial thrusts and in combination a plate having a hole as a seating and a cup shaped lower race ring made of stamped sheet metal and provided with a cylindrical portion adapted to be pressed into said hole and with an adjoining cylindrical ring portion adapted to serve as a race, an upper funnel-shaped race ring formed as a spring by means of its serrated edge, a spindle inserted with a neck into the upper race, a washer inserted between a shoulder of a spindle and the upper race, and lugs formed on the edge of the cylindrical portion of the upper race, part of these lugs being bent outwardly to hold the race in the plate and part being bent inwardly to hold back the upper race.

3. In an annular ball bearing adapted to resist axial thrusts and in combination, a base plate with a drilled hole to receive said ball bearing, a partly cylindrical and cup-shaped member made of stamped sheet metal and having the cylindrical portion pressed into said hole and the adjoining cup-shaped portion serving outside of said hole as the lower race ring of the balls, a funnel shaped serrated member having a cylindrical ring portion forming the upper race of the bearing and an adjoining central portion to act as a guide for a spindle, and an abutment washer taking up the thrust of said spindle and acting as a spring together with the serrations of the funnel shaped member supporting the same.

4. In an annular ball bearing adapted to resist axial thrusts and in combination, a base plate with a drilled hole to receive said ball bearing, a partly cylindrical and partly cup-shaped member made of stamped sheet metal and having the cylindrical portion pressed into said hole and the adjoining cup-shaped portion serving outside of said hole as the lower race ring of the balls, a funnel-shaped member having a cylindrical ring portion forming the upper race and an adjoining flat and perforated central portion as a guide for a spindle, and a bulged abutment washer resting on the funnel shaped member to take up the axial thrust of said spindle.

5. In an annular ball bearing adapted to resist axial thrusts and in combination, a base plate having a hole as a seating and a partly cylindrical and partly cup-shaped lower race ring made of stamped sheet metal and provided with a cylindrical portion pressed into said hole by the application of pressure and with a cylindrical ring portion adapted to serve as a ball race to maintain the correct operating of the bearing, the second mentioned portion having the same diameter as the first and being located remotely to the pressed portion to preserve the shape of the ball race against the effect of the applied pressure.

ROBERT ANNEN.